April 5, 1960  L. JENSEN, JR  2,931,123
FISHING LURE
Filed April 7, 1958
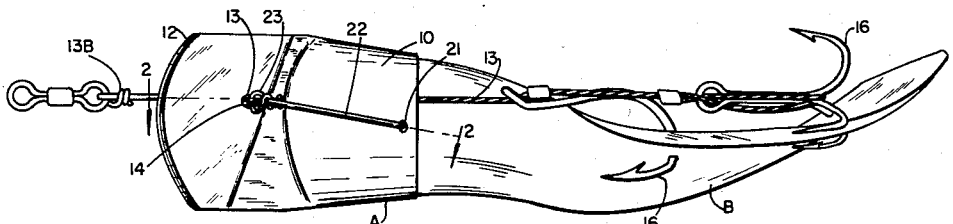
Fig-1
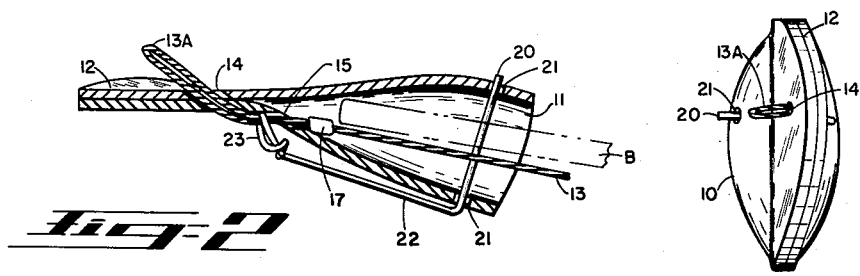 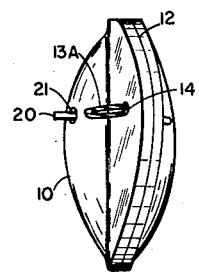
Fig-2  Fig-3
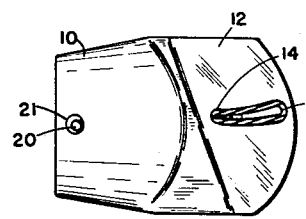 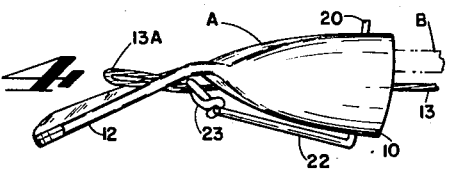
Fig-4  Fig-5
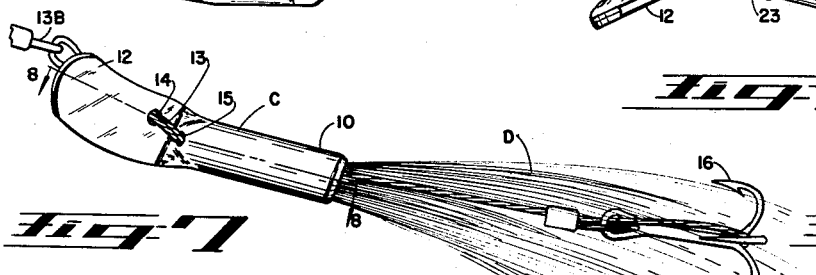
Fig-7  Fig-6
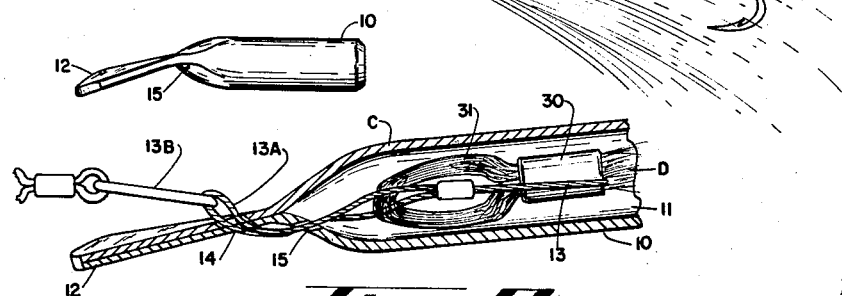
Fig-8
INVENTOR.
LUHR N. JENSEN, JR.
BY
Cook and Schermerhorn
ATTORNEYS

United States Patent Office 2,931,123
Patented Apr. 5, 1960

2,931,123

FISHING LURE

Luhr Jensen, Jr., Hood River, Oreg., assignor to Luhr Jensen & Sons, Hood River, Oreg., a partnership Application April 7, 1958, Serial No. 726,905

3 Claims. (Cl. 43—41)

This invention relates to improvements in a fishing lure.

Objects of the invention are to provide a lure having novel and improved features; to provide a lure adapted for gyratory rotation in the water; to provide a bait holder lure and to provide a simple and inexpensive form of construction which is adapted to hold either natural or artificial bait for the purpose of attracting fish and catching the fish on a hook connected with the lure.

Two preferred embodiments of the invention are illustrated on the accompanying drawing but it is to be understood that the device is capable of still other modifications within the scope of the invention as defined in the appended claims.

In the drawing:

Figure 1 is a side elevation view showing the principles of the invention embodied in a bait holding lure;

Figure 2 is a longitudinal sectional view on the line 2—2 in Figure 1;

Figure 3 is an end elevation view of the device shown in Figure 1;

Figure 4 is a side elevation view of the opposite side of the body portion shown in Figure 1;

Figure 5 is a top plan view of the body portion shown in Figure 1;

Figure 6 is a side elevation view of a modification used with artificial bait;

Figure 7 is a top plan view of the body portion of the device shown in Figure 6; and Figure 8 is a longitudinal sectional view on the line 8—8 in Figure 6.

Figure 1 shows a body member A holding a piece of natural or artificial bait B. The body member A may be made in various ways but, in the present example, it is formed from a short piece of metal tubing, such as copper or brass which may be polished to impart a shiny surface the same as metal spinner blades. The trailing end 10 of the tube is left open to provide a bait holding socket at 11 while the leading end 12 of the tube is pinched together and flattened to form a vane to react on the water. Thus, there is substantially no waste of material in forming the body A from tubing and the forming operation is relatively simple and inexpensive.

In this embodiment the tubular end portion 10 is also partially flattened to form a socket 11 of oval shape in cross section for receiving a piece of bait which is somewhat wider than it is thick. The bait B may be, for example, a strip of pork rind, a minnow or herring, or a flexible plastic imitation of such baits.

The flattened vane portion 12 is preferably bent to one side and slightly twisted relative to tubular end portion 10 in order to have a propeller action which will cause the lure to gyrate in the water in a spiral path one or two feet in diameter when trolled.

The lure is trolled by a wire or leader 13 passing through an aperture 14 in the flattened vane 12 and then through a second aperture 15 opening into the forward end of bait socket 11. Fish hooks 16 are attached to wire or leader 13 adjacent portions of the bait B trailing behind the socket 11. A collar, connector or other device 17 on leader 13 provides a stop or abutment on the leader to prevent the same from pulling forward through the aperture 15. Stop 17 thereby permits the end loop 13a to be withdrawn rearwardly from apertures 14 and 15 in order to change hooks, the position of stop 17 on the leader determining the trailing distance of the hooks behind socket 11. Stop 17 may be merely a knot which forms the loop 13a. Loop 13a is attached to a connector and swivel fitting 13b (shown only in Figure 1) for connection with the fish line or main leader.

The bait B is secured in socket 11 by a piercing pin 20 passing through a pair of aligned holes 21 in opposite socket walls. Pin 20 has a bent exterior end 22 equipped with an eye 23 receiving the leader 13 to prevent loss of the pin when changing bait or when there is no bait in the holder. When there is bait in the holder, the frictional engagement of the bait with the pin holds the pin in position in holes 21 so that the pin will not accidentally or casually become removed therefrom. Preferably, the bait is inserted in the socket as shown in Figure 2 so that leader 13 will tend to crowd the bait toward the side of the socket opposite aperture 15 and thereby hold pin 20 engaged in both holes 21. The L-shape of the pin and its securement to the leader at 23 also tend to prevent accidental withdrawal of the pin.

Figures 6 to 8 illustrate a modified form of construction having a body C adapted for use with a tassel or buck tail streamer type of bait D. In this embodiment the rear or tubular end 10 of the body may conveniently be left circular in the original shape of the tube stock material, the stock being of somewhat smaller size in diameter than the stock used for body A in Figure 1. The pinched and flattened forward end 12 is bent slightly to one side and given a slight propeller twist, as in the case of the lure of Figure 1, to impart a circular gyratory motion in the water rather than a simple spinning motion. The detailed description of the structural features of the body C will not be repeated, these features being given the same reference numerals already referred to and described in detail in connection with the first embodiment in Figures 1 to 5.

The artificial bait D, by way of example, is composed of a bundle or tassel of colored threads or plastic filaments doubled back and bound together by a small crimped ferrule 30. Ferrule 30 forms an eye or loop 31 which may be passed through the loop 13a to secure bait D to the leader 13. This makes the pin 20 of the first embodiment unnecessary in the second embodiment. Ferrule 30 and loop 31 are contained within socket 11 and the tassel trails rearwardly therefrom, partially concealing and guarding the hooks 16.

Although the body members A and C are preferably made of metal to take a high polish and provide sufficient weight for submerging the lure, these body members may be made of plastic or other suitable material, if desired.

Having now described my invention and in what manner the same may be used, what I claim as new and desire to protect by Letters Patent is:

1. A fishing lure comprising a short length of tubing having two opposite side portions disposed flat together at one end to form a vane at a small angle to the axis of the tubing for imparting a gyratory motion to the lure when trolled in water, the other end of said tubing being open to form a bait socket, said socket having a fish hook leader aperture in one side thereof and said vane having a leader aperture adjacent the socket aperture, said socket being adapted to receive the forward end of a trailing bait element and said apertures being arranged to direct a fish hook leader through said socket and extending therefrom in trailing position.

2. A fishing lure comprising a short length of tubing, one end of said tubing being open to form a bait socket, two opposite side wall portions of the other end of said tubing being disposed flat together to form a fixed, integral vane projecting forward rigidly from said socket at a small angle from the sides of the socket, said socket having a fish hook leader aperture at a point adjacent one side of said vane, and said vane having a leader aperture adjacent said socket aperture.

3. A fishing lure as defined in claim 2, said socket further having a pair of aligned transverse apertures in two opposite side portions thereof, and a bait impaling pin insertable in said transverse apertures, said pin having a bent exterior portion equipped with an eye to receive a leader in the space between said leader apertures in said socket and vane.

References Cited in the file of this patent

UNITED STATES PATENTS

| | | |
|---|---|---|
| 2,461,755 | Miller | Feb. 15, 1949 |
| 2,522,179 | Jensen et al. | Sept. 12, 1950 |
| 2,617,226 | Yoshii | Nov. 11, 1952 |
| 2,791,056 | Davis | May 7, 1957 |
| 2,794,288 | Marshall et al. | June 4, 1957 |
| 2,860,443 | Robinson | Nov. 18, 1958 |